United States Patent [19]
Altena et al.

[11] Patent Number: 5,281,448
[45] Date of Patent: Jan. 25, 1994

[54] METHOD FOR COATING THE BULB WALL OF A LOW-PRESSURE MERCURY VAPOR DISCHARGE LAMP WITH A LUMINESCENT LAYER AND LOW-PRESSURE MERCURY VAPOR DISCHARGE LAMP PROVIDED WITH SUCH A LUMINESCENT LAYER

[75] Inventors: Franciscus W. Altena, Roosendaal; Ingrid Rotte, Eindhoven; Johan G. Kloosterboer, Eindhoven; Matthias H. J. Van Rijswick, Eindhoven; Petrus W. V. Kop, Roosendaal; Gerharda M. Van Der Valk, Eindhoven, all of Netherlands

[73] Assignee: U.S. Philips Corporation, New York, N.Y.

[21] Appl. No.: 797,878

[22] Filed: Nov. 26, 1991

[30] Foreign Application Priority Data

Nov. 28, 1990 [NL] Netherlands ............... 9002592

[51] Int. Cl.⁵ .............................. B05D 5/06
[52] U.S. Cl. ........................ 427/510; 427/508; 427/64; 427/66; 427/67; 427/377; 427/389.7; 427/407.2
[58] Field of Search ............. 427/44, 64, 66, 389.7, 427/54.1, 67, 377, 510, 508, 407.2

[56] References Cited

U.S. PATENT DOCUMENTS

| | | | |
|---|---|---|---|
| 3,767,445 | 10/1973 | Chandross et al. | 427/164 |
| 3,849,185 | 11/1974 | Shepherd et al. | 427/164 |
| 4,233,336 | 11/1980 | Verdult et al. | 427/67 |
| 4,292,107 | 9/1981 | Tanaka et al. | 156/249 |
| 4,393,330 | 7/1983 | Skwirut et al. | 427/67 |
| 4,637,898 | 1/1987 | DeBoer et al. | 252/301.36 |

FOREIGN PATENT DOCUMENTS 54-131863  4/1978  Japan.
RD194041   6/1980  Japan.

*Primary Examiner*—Janyce Bell
*Attorney, Agent, or Firm*—Brian J. Wieghaus

[57] ABSTRACT

A method of coating the bulb wall of a low-pressure mercury vapour discharge lamp with a luminescent layer, whereby a monomer and an initiator are added to a suspension comprising at least a luminescent material and a binder before a layer of this suspension is provided, which monomer is polymerized after drying of the suspension layer in order to fix the luminescent material and the binder.

20 Claims, 1 Drawing Sheet

METHOD FOR COATING THE BULB WALL OF A LOW-PRESSURE MERCURY VAPOR DISCHARGE LAMP WITH A LUMINESCENT LAYER AND LOW-PRESSURE MERCURY VAPOR DISCHARGE LAMP PROVIDED WITH SUCH A LUMINESCENT LAYER

BACKGROUND OF THE INVENTION

The invention relates to a method of coating the bulb wall of a low-pressure mercury vapour discharge lamp with a luminescent layer, which layer comprises at least one luminescent material, in which method a layer of a suspension consisting of a suspension medium containing the luminescent material and a binder is provided, after which the suspension layer is dried through evaporation of the suspension medium.

Suspension mediums used in the known method are, for example, water or butyl acetate. Binders which can be used are, for example, carboxymethylcelluluose, polyethylene oxide, and nitrocellulose.

In the manufacture of fluorescent lamps having only one luminescent layer, the binder is removed from the suspension layer through heating of the bulb in a sintering oven after drying of the suspension layer. The luminescent layer then remains on the bulb wall with good adhesion.

Problems arise in the manufacture of fluorescent lamps having several, for example two, luminescent layers, especially if the same suspension medium and the same binder are used for the first and for the second luminescent layer.

When the second suspension layer is provided after drying of the first suspension layer, the luminescent material and the binder from the first layer are re-suspended in the liquid second suspension layer. The result is that the first layer is completely or partly flushed off during the provision of the second suspension layer, which is unacceptable. This flushing-off effect could be prevented by removing the binder in the first layer by heating in a sintering oven before the second layer is provided. Compared with the situation in which the bulb is not heated in a sintering oven until after the two layers have been provided, however, this entails an additional process step, which is time-consuming and expensive.

SUMMARY OF THE INVENTION

The invention has for its object inter alia to provide a method by which flushing-off of the first suspension layer is prevented without an additional process step and in a simple and inexpensive manner.

To achieve the envisaged object, according to the invention, a method of the kind described in the opening paragraph is characterized in that a monomer and an initiator are added to the suspension before the suspension layer is provided and the monomer is polymerized after drying of the applied suspension layer in order to fix the luminescent material and the binder.

A large number of monomers, which are small molecules, are coupled together to form macromolecular chains during polymerisation. A three-dimensional network is created in the suspension layer by this, ensuring that this layer is resistant to flushing-off during the provision of the second suspension layer. The initiator serves to set the chain growing process in motion.

A favourable embodiment of the method according to the invention is characterized in that the monomer is chosen from the group of materials consisting of $\alpha,\omega$-diacrylates, triacrylates, dimethacrylates, trimethacrylates and acrylates having more than three acrylate groups or methacrylate groups.

Good results are obtained with:
tetraethyleneglycol diacrylate
ethoxylated trimethylolpropane triacrylate
polyethyleneglycol-600-dimethacrylate.

A further favourable embodiment of the method according to the invention is characterized in that the initiator is a photo-initiator and the monomer is photopolymerized through irradiation of the suspension layer with UVA within the 315–400 nm wavelength range.

A good photo-initiator is 1,1-dimethoxy-1-phenylacetophenon (DMPA).

The application of the suspension layer by means of photopolymerization, according to the invention, may also be advantageous in a different way. A favourable embodiment of the method according to the invention is accordingly characterized in that the suspension layer is irradiated over only part of its surface area, and the non-irradiated portion of the suspension layer is removed with a solvent.

It is achieved in this way that a certain pattern, for example a legend, is created on the irradiated areas of the suspension layer. Such a pattern becomes visible when a finished fluorescent lamp is operated and may be used, for example, for providing information or commercial messages.

A further favourable embodiment of the method according to the invention is characterized in that the initiator is a thermal initiator and the monomer is thermally polymerized through a rise in temperature of the suspension layer.

Preferably, the thermal initiator is chosen from the group of materials consisting of dialkyl peroxides, diaryl peroxides, alkylaryl peroxides, peresters and azobisisobutyronitrile. Among the satisfactorily operating thermal initiators are dibenzoyl peroxide and bis(4-tert.butylcyclohexyl) peroxydicarbonate.

The polymerization process may take place while the bulb is arranged with the suspension layer exposed to the air. It has been found, however, that the presence of oxygen has an adverse effect on the speed of the polymerization reaction. In order to obviate this disadvantage, a favourable embodiment of the method according to the invention is characterized in that the suspension layer is in an atmosphere of an inert gas during polymerization.

Preferably, the inert gas is nitrogen.

It is achieved in this way that shorter irradiation times (photopolymerization) or shorter heating times (thermal polymerization) suffice.

The invention further relates to a low-pressure mercury vapour discharge lamp provided with a luminescent layer manufactured by the method according to the invention.

BRIEF DESCRIPTION OF THE DRAWING

The invention will be explained in greater detail with reference to a drawing, in which.

DESCRIPTION OF THE PREFERRED EMBODIMENTS

Figure 1:
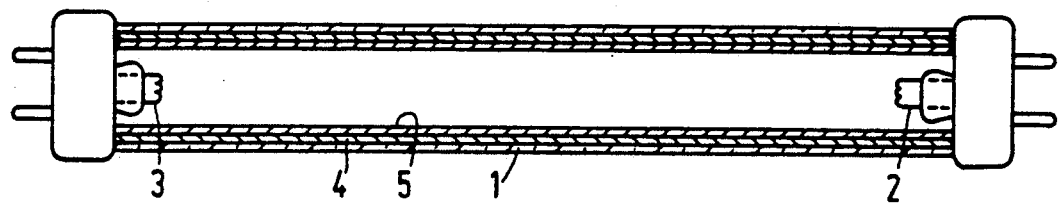
FIG. 1 is a longitudinal section of a low-pressure mercury vapour discharge lamp having two luminescent layers.

The lamp of FIG. 1 has a closed glass discharge bulb 1 which contains mercury and a rare gas, for example argon, as a starting gas. Inside the bulb 1 are arranged electrodes 2 and 3, between which the discharge is maintained during operation of the lamp. The bulb 1 is provided on its inner side with a first luminescent layer 4 and a second luminescent layer 5. The two layers comprise luminescent materials which emit light upon excitation by mainly 254 nm radiation from the mercury discharge. It will now be described with reference to two embodiments how the two luminescent layers 4 and 5 are provided on the wall of the bulb 1 before the manufacture of the finished lamp.

Embodiment 1 (Photoplymerization)

A suspension was made with water as the suspension medium. The suspension contained per 150 g water:

| | |
|---|---|
| 100 g | white luminescing calcium halophosphate activated by trivalent antimony and bivalent manganese as a luminescent material |
| 3.3 g | polyethylene oxide as a binder |
| 0.7 g | tetraethyleneglycol diacrylate as a monomer |
| 0.028 g | 1,1-dimethoxy-1-phenylacetophenon (DMPA) as a photo-initiator. |

The suspension was provided on the bulb wall 1 as a first layer 4 in usual manner and the layer was dried with hot air. Subsequently, the dried layer was subjected to UVA radiation by means of 65 W TL 09/R low-pressure mercury vapour discharge lamps which are also used for suntanning purposes. The irradiance was approximately 10 mW per cm$^2$ bulb wall surface area and the irradiation time was approximately 20 s. Nitrogen gas was conducted through the bulb during the irradiation, which is favourable in that short irradiation times can suffice.

The UVA radiation leads to polymerization of the monomer, so that the layer 4 adheres well to the bulb wall 1.

After irradiation, a second suspension layer 5 was provided on the layer 4, consisting of:
water as a suspension medium
polyethylene oxide as a binder
blue-luminescing barium-magnesium aluminate activated by bivalent europium, green-luminescing cerium-magnesium aluminate activated by trivalent terbium, and red-luminescing yttrium oxide activated by trivalent europium as luminescent materials. After the second layer 5 had been dried with hot air, the bulb provided with the two layers was heated at approximately 600° C. in a sintering oven for approximately two minutes, during which the binder was baked out from the two layers and the polymer from the first layer.

Thanks to the polymerization process in the first layer 4, this layer is not re-suspended in the second layer 5 when the latter layer is provided.

The resistance to flushing-off of the first layer 4 can be determined by weighing the bulb before the second layer 5 is provided, filling it partly with water, shaking it, emptying it, and drying it, upon which the weight loss of luminescent material resulting from flushing-off is determined. Substantially all luminescent material was flushed off in the case of a layer not irradiated with UVA. Approximately 98% of the luminescent layer remained intact in the case of a layer treated as described above.

In lamps having, for example, three luminescent layers, the second layer may also be photopolymerized in the way as described for the first layer

Embodiment 2 (Thermal Polymerization)

A suspension was made with butylacetate as a suspension medium. The suspension contained per 81 g butylacetate:

| | |
|---|---|
| 100 g | white-luminescing calcium halophosphate activated by trivalent antimony and by bivalent manganese as a luminescent material |
| 1 g | nitrocellulose as a binder |
| 1.6 g | tetraethyleneglycol diacrylate as a monomer |
| 0.064 g | dibenzoyl peroxide as a thermal initiator. |

This suspension was provided on the bulb wall 1 as a first layer 4, which layer was then dried with hot air. After that, the dried layer was thermally polymerized through heating of the bulb in an oven at 90° for five minutes. Nitrogen gas was conducted through the bulb during this heat treatment.

After the thermal polymerization, a second suspension layer 5 identical to that of embodiment 1 was provided on the layer 4. After drying of this second layer 5, the bulb was again put in a sintering oven and the binder was removed from the layers 4 and 5 and the polymer from the layer 4 through heating, as described for embodiment 1.

The flushing-off test described for embodiment 1, when applied to the thermally polymerized layer 4, had the result that this layer remained substantially 100% intact.

The thermal polymerization process may also be carried out in air instead of in a nitrogen atmosphere. A flushing-off resistance of more than 90% was obtained for the layer 4 referred to above with a heat treatment during ten minutes at 120° C. in air.

It was described for embodiment 1 how the entire layer 4 was fixed to the bulb wall by means of photopolymerization. It is also possible, however, to photopolymerize this layer (or several layers) only locally and to remove the non-irradiated portions with a solvent. A desired pattern can be realised in this way, which will be explained with reference to the following embodiment.

Embodiment 3 (Patterning through Photopolymerization)

A suspension was made with butyl acetate as a suspension medium. The suspension contained per 119 g butyl acetate:

| | |
|---|---|
| 100 g | red-luminescing yttrium oxide activated by trivalent europium as a luminescent material |
| 1.3 g | nitrocellulose as a binder |
| 0.8 g | ethoxylated trimethylolpropane triacrylate as a monomer |
| 0.032 g | 1,1-dimethoxy-1-phenylacetophenon (DMPA) as a photo-initiator. |

This suspension was provided on the bulb 1 as a layer, which layer was then dried with hot air. Then a stencil in the form of a tube was provided around the bulb. In the present embodiment, the tube consisted of an overhead sheet showing the legend "EXIT" against a black background. Only the letters forming the word "EXIT" accordingly transmitted UVA radiation. The bulb with tube was subsequently exposed to UVA radiation from 40 W TLK 09/N low-pressure mercury vapour discharge lamps. The irradiance was approximately 10 mW per cm² bulb wall surface and the irradiation time was approximately 20 s. An air/nitrogen mixture (5 vol % oxygen) was conducted through the bulb during the irradiation.

Figure 2:
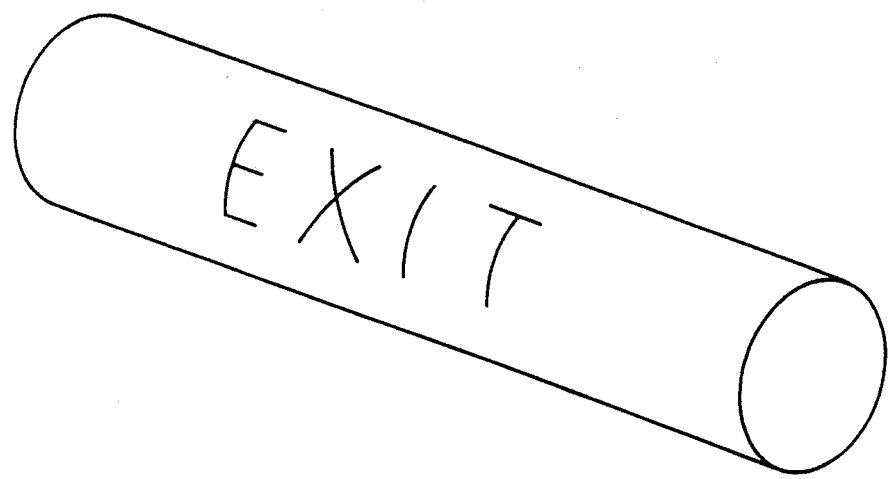
FIG. 2 is an elevation of a tubular section of a burning fluorescent lamp provided with a legend.

Only the portions of the suspension layer on the bulb wall forming the legend "EXIT" were photopolymerized by the UVA radiation. The non-irradiated portions were removed with butyl acetate. A luminescent layer in the form of the legend "EXIT" thus remained on the bulb wall. The bulb was subsequently heated in a sintering oven again to remove the binder and the polymer. FIG. 2 shows a portion of the finished lamp thus obtained in the operating state.

In the example given the legend "EXIT" is present in positive form. It is alternatively possible to provide the legend as a negative. For this purpose, the stencil should be so designed that the letters forming the word "EXIT" are imperviable to UVA, whereas the background transmits UVA. After irradiation, the luminescent layer will not be polymerized in the area of the letters, and the non-irradiated letter portions of the layer are removed with a solvent such as butyl acetate.

Obviously, more than one layer in which local photopolymerization is carried out may be provided.

We claim:

1. A method of coating the bulb wall of a low pressure mercury vapor discharge lamp with first and second luminescent layers each having a luminescent material, said method comprising the steps of:
   a) providing the first layer on the bulb wall with a first suspension comprising a suspension medium, a luminescent material of the first layer, a binder, a monomer and an initiator;
   b) drying the applied first suspension layer;
   c) polymerizing the monomer of the first layer to form a macromolecular polymer chain to fix the luminescent material and the binder;
   d) providing the second layer on the first layer with a second suspension comprising a suspension medium, a binder, and a luminescent material of the second layer;
   e) drying the applied second suspension layer; and
   f) heating the first and second layers to remove the binder from the first and second layers and the polymer from the first layer.

2. A method as claimed in claim 1, characterized in that the monomer is chosen from the group of materials consisting of δ,ωdiacrylates, triacrylates, dimethacrylates, trimethacrylates and acrylates having more than three acrylate groups or methacrylate groups.

3. A method as claimed in claim 2, characterized in that the initiator is a photo-initiator and the monomer is photopolymerized through irradiation of the suspension layer with UVA within the 315–400 nm wavelength range.

4. A method as claimed in claim 3, characterized in that the photo-initiator is 1,1-dimethoxy-1-phenylacetophenon (DMPA).

5. A method as claimed in claim 4, characterized in that the suspension layer is irradiated over only part of its surface area, and in that the non-irradiated portion of the suspension layer is removed with a solvent.

6. A method as claimed in claim 2, characterized in that the initiator is a thermal initiator and the monomer is thermally polymerized through a rise in temperature of the suspension layer.

7. A method as claimed in claim 6, characterized in that the thermal initiator is chosen from the group of materials consisting of dialkyl peroxides, diaryl peroxides, alkylaryl peroxides, peresters and azobisisobutyronitrile.

8. A method as claimed in claim 7, characterized in that the suspension layer is in an atmosphere of an inert gas during polymerization.

9. A method as claimed in claim 8, characterized in that the inert gas is nitrogen.

10. A method as claimed in claim 3, characterized in that the suspension layer is irradiated over only part of its surface area, and in that the non-irradiated portion of the suspension layer is removed with a solvent.

11. A method as claimed in claim 1, characterized in that the initiator is a photo-initiator and the monomer is photopolymerized through irradiation of the suspension layer with UVA within the 315–400 nm wavelength range.

12. A method as claimed in claim 11, characterized in that the photo-initiator is 1,1-dimethoxy-1-phenylacetophen (DMPA).

13. A method as claimed in claim 12, characterized in that the suspension layer is irradiated over only part of its surface area, and in that the non-irradiated portion of the suspension layer is removed with a solvent.

14. A method as claimed in claim 11, characterized in that the suspension layer is irradiated over only part of its surface area, and in that the non-irradiated portion of the suspension layer is removed with a solvent.

15. A method as claimed in claim 1, characterized in that the initiator is a thermal initiator and the monomer is thermally polymerized through a rise in temperature of the suspension layer.

16. A method as claimed in claim 15, characterized in that the thermal initiator is chosen from the group of materials consisting of dialkyl peroxides, diaryl peroxides, alkylaryl peroxides, peresters and azobisisobutyronitrile.

17. A method as claimed in claim 1, characterized in that the suspension layer is in an atmosphere of an inert gas during polymerization.

18. A method as claimed in claim 2, characterized in that the suspension layer is in an atmosphere of an inert gas during polymerization.

19. A method as claimed in claim 3, characterized in that the suspension layer is in an atmosphere of an inert gas during polymerization.

20. A method according to claim 1, wherein said second suspension is free of a monomer and an initiator.

* * * * *